United States Patent [19]
Ozero

[11] 3,950,896
[45] Apr. 20, 1976

[54] SANDING ATTACHMENT FOR RECIPROCAL SAW MACHINES

[76] Inventor: Adam H. Ozero, 419 Walter Ave., Victoria, British Columbia, Canada

[22] Filed: Jan. 14, 1975

[21] Appl. No.: 540,988

[52] U.S. Cl. .................................. 51/170 TL
[51] Int. Cl.² .................................. B24B 23/00
[58] Field of Search.......... 51/170 TL, 170 MT, 181

[56] References Cited
UNITED STATES PATENTS

| | | |
|---|---|---|
| 3,755,972 | 9/1973 | Mogaki et al................ 51/170 MT |
| 3,841,416 | 10/1974 | Pfister............................ 51/170 PT |

Primary Examiner—James L. Jones, Jr.
Attorney, Agent, or Firm—Howard I. Podell

[57] ABSTRACT

A sanding attachment for jig saw machine that fastens to the shank of a jig saw or other reciprocal saw machine. The attachment includes a sanding block shaped with a fitting for fastening to the shank of a jig saw and a handle which is clampable to the fixed shoe of the jig saw to furnish a manual grip.

1 Claim, 2 Drawing Figures

SANDING ATTACHMENT FOR RECIPROCAL SAW MACHINES

SUMMARY OF THE INVENTION

My invention is a sanding attachment for a jig saw machine that fastens to the shank of a jig saw or other reciprocal saw machine such as a portable sabre saw. The attachment includes a sanding block shaped with a fitting for fastening to the shank of a jig saw and a handle which is clampable to the fixed shoe of the jig saw to furnish a manual grip.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
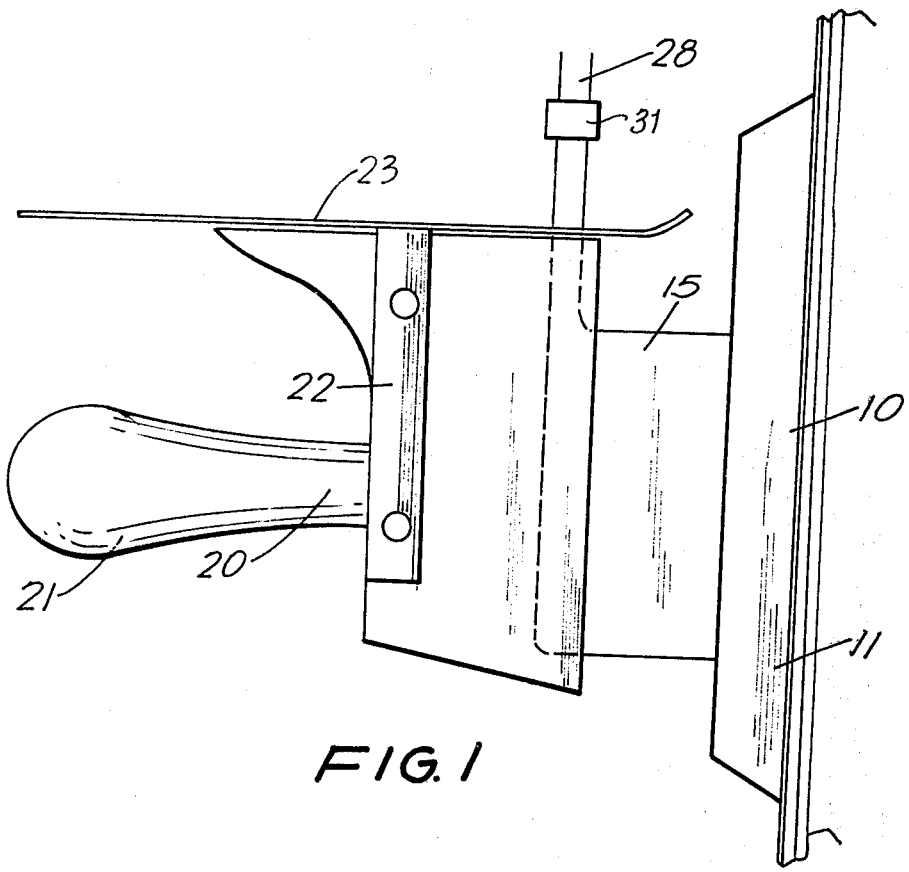
FIG. 1 is an elevation view of the invention installed on a jig saw.
Figure 2:
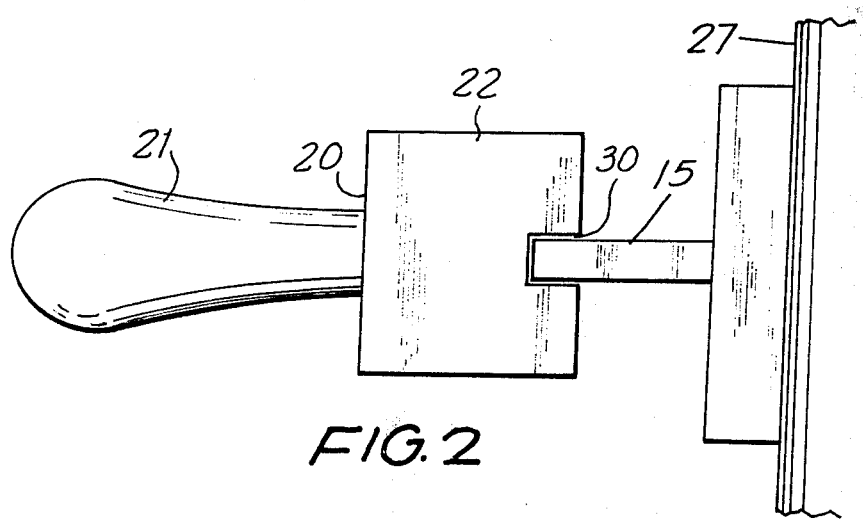
FIG. 2 is a bottom view of the invention in the installed position.

Turning now descriptively to the drawings, in which similar reference characters denote similar elements throughout the several views, FIGS. 1-2 illustrate the attachment sanding block unit 10 and handle unit 20. Handle unit 20 consists of a shaped knob 21 fastened to a clamp bracket 22 which is bolted to the fixed jig saw shoe 23 of a jig saw machine, so that the knob 21 may be manually gripped to apply bearing pressure against the sanding block unit 10 to which, as shown in FIG. 2, it is slidably engaged.

Sanding block unit 10 is formed with a sanding plate 11 to which a sheet of sandpaper or emery paper may be externally fastened or bonded, with a bracket plate 15 fastened to the sanding plate and shaped to fit between the forks of the fixed jig saw shoe 23 and to fasten to the saw attachment clamp 31 of the reciprocatable shank 28 of the jig saw machine. Bracket plate 15 rides freely in groove 30 in clamp bracket 22, as shown in FIG. 2.

In use, with the shank 28 of the machine reciprocating, bearing pressure is applied by gripping of knob 21 so as to furnish pressure of the sanding plate 11 against a surface 27 which is to be sanded.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent is:

1. An attachment for converting a reciprocating saw machine to a reciprocating sanding machine comprising
   a bracket member which may be fastened to a fixed shoe of a reciprocating saw machine,
   a sanding plate fitted with a bracket of a shape to attach to the saw clamp of the saw machine, said bracket shaped to slidably ride in a groove in the said bracket member, and
   a handle fixed to the bracket member, located to project away from the bracket member for manual application of a bearing force to the sanding plate.

* * * * *